Patented Apr. 16, 1940

2,197,362

UNITED STATES PATENT OFFICE 2,197,362

PROCESS AND PRODUCT RELATING TO TREATMENT OF UNSATURATED HALIDES

Herbert P. A. Groll, Berkeley, and Clarence J. Ott, San Francisco, Calif., assignors to Shell Development Company, San Francisco, Calif., a corporation of Delaware No Drawing. Original application May 18, 1935, Serial No. 22,170. Divided and this application October 12, 1936, Serial No. 105,292

18 Claims. (Cl. 260—485)

This invention relates to a process for the preparation of useful and, in some cases, novel unsaturated organic compounds which comprises reacting an unsaturated halide possessing an olefinic linkage between two carbon atoms at least one of which is tertiary and one of which is linked to a saturated monohalogenated carbon atom with an organo metallo compound.

It is known that some saturated halides, and unsaturated halides which do not possess the active structural arrangement herein described, have been reacted to a very limited extent with certain metal compounds embraced by the group which we have found suitable for our purpose. In many cases, the saturated halides are unreactive under the conditions of execution of our invention. When reaction can be made to take place, it generally proceeds very slowly and incompletely, resulting in poor yields of the desired products. Efforts to increase the rate of the reaction by employing more rigorous reaction conditions and longer contact times of the reactants, result in the excessive occurrence of undesirable decomposition, polymerization and condensation reactions.

It is known that when a saturated halide is reacted with an ethereal solution of an organo magnesium compound, the reaction can only be initiated at temperatures above the boiling point of the ethereal solution. If the applied saturated halide contains two or more carbon atoms, substantially all of it is, under conditions necessary to effect reaction at a practical rate, decomposed to unsaturated hydrocarbons. Now we have found that the isobutenyl halides and their homologues, analogues and suitable substitution products react violently with the organo magnesium halides at room temperatures, resulting in practically quantitative yields of the combination product of the unsaturated radical of the halide with the organic radical of the organo magnesium halide. It will be seen that our process provides a practical and economical method for the synthesis of the higher tertiary olefines.

We have found that the unsaturated halides to which the principles of our invention are applicable are relatively much more reactive with respect to the organo metallo compounds herein disclosed than the saturated halides and unsaturated halides which do not possess an unsaturated tertiary carbon atom linked by a single bond to a halogenated carbon atom or linked by a double bond to a carbon atom which in turn is linked to a saturated monohalogenated carbon atom. Accordingly, the unsaturated halides possessing such a structural arrangement can, by virtue of their relatively greater activity, be substantially completely reacted with a suitable metal compound at practical rates under conditions of temperature, pressure and contact time of the reactants at which the substantial occurrence of undesirable side reactions is avoided.

The metal compounds which we employ in the execution of our invention are selected from a group of chemically related compounds which behave in a like manner as regards their reaction with organic halides. The reaction which occurs in the execution of our invention comprises union of the unsaturated organic radical of the halide with the negative radical of the metal compound while the halogen atom of the unsaturated halide combines with the metal radical of the metal compound to form the corresponding metal halide.

The unsaturated halides employed in the execution of our invention comprise an unsaturated alkyl chain which chain may or may not be linked to a cyclic radical as of the aromatic, alicyclic and heterocyclic series, or the unsaturated alkyl chain may comprise part of an alicyclic structure.

Suitable unsaturated halides are those possessing the structural grouping

$$-C^{III}=C^{III}-C^{II}-Hal$$

wherein at least one of the carbon atoms designated $C^{III}$ is linked to three other carbon atoms. The $C^{II}$ carbon atom is preferably saturated and linked to a single halogen atom; however, other carbon atoms in the molecule may or may not be linked to one or more halogen atoms. The loose bonds may be taken up by hydrogen atoms and/or by the same or different radicals as alkyl, alkenyl, aralkyl, aralkenyl, carbocyclic, heterocyclic, alicyclic, alkoxy, aralkoxy and the like radicals which may be further substituted, it being understood that one of the $C^{III}$ carbon atoms is tertiary and that the $C^{II}$ carbon atom is monohalogenated. A suitable halide may possess one or a plurality of double bonds. Particularly suitable polyolefinic halides are those possessing a like number of olefinic bonds and halogen atoms, each olefinic linkage embracing a tertiary carbon atom linked to a saturated monohalogenated carbon atom.

A preferred group of unsaturated halides includes, among others, compounds such as

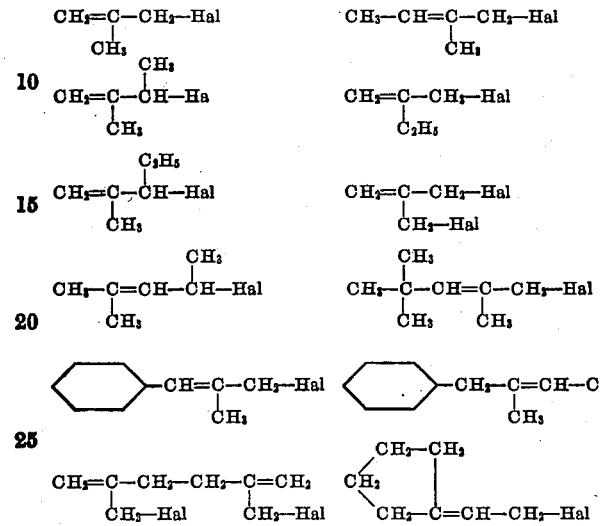
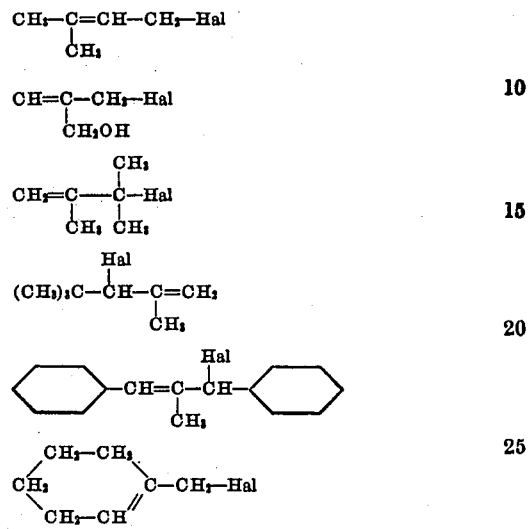

and the like and their homologues, analogues and suitable substitution products.

The unsaturated halides may be prepared by any of the methods known to the art and used severally or in mixtures comprising more than one species of unsaturated halides. In some cases, it may be advantageous to effect the reaction with the reactants dissolved or suspended in a relatively inert medium such as a hydrocarbon, halogenated hydrocarbon, mineral oil, ether, alcohol and the like. Suitable unsaturated halides may be conveniently prepared by effecting the chlorination of tertiary olefines. For example, we may, under suitable conditions, effect the chlorination of tertiary amylenes and obtain a mixture comprising one or more suitable isopentenyl halides, which mixture may be treated as such or, if several species are present they may be separated and independently treated.

In accordance with the invention, a suitable unsaturated halide is caused to react with a selected metal compound. A suitable metal compound is selected from the group consisting of metal compounds which may be represented by the formula M—X wherein M represents a metal and X represents an organic radical linked by a carbon atom to the metal. The particular metal may be monopolyvalent. In the case that the metal is polyvalent, the monovalent X radical may take up one or more of the valences, the other bonds being linked to suitable elements or groups. For example the type formula for a divalent metal compound may be MX₂ or —M—X wherein the loose bond may be taken up by suitable substituent such as a halogen atom. In the execution of our invention, the reaction which occurs may be represented by the equation:

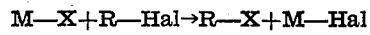

wherein R represents an organic radical possessing an unsaturated tertiary carbon atom linked to a monohalogenated carbon atom or linked by a double bond to an unsaturated carbon atom which in turn is linked to a saturated monohalogenated carbon atom.

The nature of the metal component of the compound selected will be dependent on the stability and reactivity of the compound and on the particular negative radical with which it is in combination. Anyone sufficiently skilled in the art to which the invention pertains will be able to select a compound or group of compounds most suitable for his particular operation. In general, any metal compound of the type herein described which is possessed of the desired activity and/or stability may be employed. Particularly useful are the suitable compounds of metals such as the alkali- and alkaline earth metals, copper, zinc, silver, magnesium, cadmium, mercury, aluminum, thallium, tin, lead, bismuth, beryllium, antimony, etc. Compounds wherein the metal-acting ammonium radical takes the place of a metal are also contemplated as suitable compounds for the purposes of this invention.

Suitable metallo organo compounds may be selected from the group embracing compounds such as sodium benzyl, lithium butyl, lithium phenyl, magnesium chloride, isoamyl magnesium chloride, phenyl magnesium bromide, naphthyl magnesium bromide, zinc diphenyl, aluminum triethyl, lead tetraethyl, thallium triethyl, thallium dipropyl chloride, sodio ethyl aceto acetate, the sodio malonic acid esters, mercury diphenyl, zinc diisobutyl, zinc diethyl, cadmium dimethyl, mercury dimethyl, mercury disecondary butyl, lead triethyl chloride and the like and their homologues, analogues and suitable substitution products.

The reaction conditions to be employed in each case will be dependent on the type of reaction involved and on the specific activity of the metal compound selected. In many cases the reaction may be initiated on contact of the reactants at room temperature. Since the reaction may, in some cases, proceed too violently, we prefer to effect the reaction in the presence of a relatively inert heat responsive solvent or diluent for the unsaturated halide. Suitable substances for this purpose are the hydrocarbons, chlorinated hydrocarbons, ethers, esters, alcohols and the like. The reaction may be effected in any suitable reaction vessel preferably equipped with means for agitating as well as heating and cooling its contents. The reaction may, in the great majority of cases, be effected at atmospheric pressure at the boiling temperature of the reaction mixture. The reaction product may be recovered from the reaction mixture in any suitable manner. For example, the reaction mixture may be refluxed until the reaction has proceeded to the desired extent; the cooled reaction mixture discharged from the reaction vessel and the metal halide separated therefrom by decantation, centrifugation and/or filtration. The liquid which contains the reaction product and may contain some unreacted unsaturated halide as well as an inert solvent or diluent may be treated in any suitable manner for recovery of the constituents thereof. For example, the reaction mixture may be distilled and the constituents separated by fractionation. Any unreacted unsaturated halide, as well as the recovered solvent or diluent may be reutilized in the same or another reactor.

The unsaturated halides, severally or in combination, may be employed in a substantially pure state or they may be dissolved in a suitable inert solvent such as an ether, alcohol, ketone and the like. The temperature of the reaction mixture may be kept substantially constant due to the vaporization of an excess of the unsaturated halide and/or an added heat responsive liquid solvent or diluent. Under such conditions, the reaction temperature is maintained at the boiling temperature of the heat responsive liquid without the use of external cooling means. The invention may be executed at any suitable temperature and pressure at which the reaction proceeds at a practical rate. With the metal salts, moderately elevated temperatures are in many cases required. If the optimum temperature of operation is above the atmospheric boiling temperature of the reaction mixture and it is desired to effect the reaction with the unsaturated halide in the liquid phase, superatmospheric pressures may be advantageously applied. If desired, the unsaturated halide may be reacted in the vapor phase. For example, the vapors of the unsaturated halide may be passed over the metallo organo compound heated to the desired temperature or through the fused compound. The unsaturated halides with which we are concerned may be reacted with the metallo organo compounds under a wide variety of operating conditions. The conditions of operation will in each case be dependent on the reactivity and stability of the particular metallo organo compound selected. The metallo organo compounds are best reacted with the unsaturated halide in the presence of an inert solvent for the reactants. The organo magnesium compounds, for example, are conveniently applied in solution in the ether or other suitable solvent in which they were prepared. With the organo magnesium halides, the reaction is initiated on contact of the ether solution of the organo magnesium compound with the unsaturated halide at room temperature. To avoid overheating and decomposition of the reactants and/or products, the exothermic reaction is maintained at about the reflux temperature of the reaction mixture under atmospheric pressure, by resorting to the use of suitable cooling means and by regulating the rate of admittance of one or both of the reactants. The unsaturated halide per se or dissolved in a suitable solvent such as ethyl ether or a homologue thereof may be added at the desired rate to the organo magnesium halide which may or may not be dissolved in an inert liquid, or a solution of the organo magnesium halide may be added to an excess of the unsaturated halide and the reaction rate and temperature controlled by cooling means and/or the rate of admittance of the reactants and the boiling temperature of the heat responsive solvent. The more stable organo metallo compounds such as the organo alkali- and alkaline earth metals, zinc, cadmium, aluminum, etc., compounds may be employed in the solid state as powders or granules or they may be dissolved or suspended in a suitable medium. Since the reaction is, in the majority of cases quite violent and is preferably executed under moderately elevated temperatures, we prefer to employ dissolving or suspending media which, by their bulk or by their evaporation under a reflux condenser or the like apparatus, convey the liberated heat to the cooling device. The less reactive organo metallo compounds such as lead tetraethyl, bismuth triethyl, etc., may be heated under reflux with the unsaturated halide which may or may not be dissolved or suspended in a suitable inert liquid medium. When it is necessary or desirable to employ higher temperatures and superatmospheric pressures, the reaction may be effected in an autoclave equipped with suitable heating means and preferably equipped with means for agitating its contents as by mechanical stirring. Although, the liquid phase method of reaction is generally preferred, it is to be understood that with the more stable organo metallo compounds vapor phase methods may be advantageously employed. For example, the vapors of the metallo organo compound in admixture with the vapors of the unsaturated halide may be passed through a reaction tube heated to the desired temperature.

A modified mode of executing our invention comprises reacting an unsaturated halide with an unsaturated organo magnesium halide in an ether solution substantially as soon as the latter is formed therein. A suitable unsaturated halide is added to a reaction vessel equipped with a reflux condenser, suitable cooling means and a mechanical stirrer, and containing magnesium and an ether. The unsaturated halide reacts with the magnesium to form the corresponding unsaturated organo magnesium halide, which, substantially as soon as it is formed, reacts with the introduced unsaturated halide to precipitate the magnesium halide and form the combination product of the two unsaturated halide radicals.

Although the mechanism of the above reaction has been illustrated with special reference to isobutenyl chloride, it is to be understood that the other unsaturated halides to which our process is applicable will react in an analogous manner resulting in excellent yields of the corresponding polyolefines.

For purposes of illustration, reference will be had to the following specific examples which typify preferred methods of executing our invention. It is to be understood that it is not our intention to limit ourselves to the specific operating conditions disclosed.

*Example I*

Normal butyl magnesium chloride was prepared in accordance with the method of Grignard by causing normal butyl chloride to react with magnesium turnings suspended in anyhydrous ethyl ether.

About 90.5 gm. (1.0 mol) of isobutenyl chloride were added slowly to about 1.1 mols of normal butyl magnesium chloride in ether solution while the latter was stirred and cooled. The reaction was conducted at a temperature of about 36° C. under atmospheric pressure. The reaction which occurred may be represented by the equation:

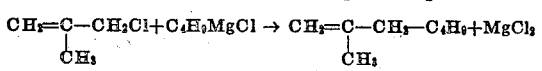

When all of the isobutenyl chloride had been added, the cooled mixture was poured on ice and neutralized with dilute hydrochloric acid. The resulting mixture was allowed to stratify and the non-aqueous layer was separated, dried and fractionated.

2-methyl heptene-1, which boiled in the range of from 119° C. to 121° C. under atmospheric pressure, was obtained in a yield of about 83%.

*Example II*

Isoamyl magnesium chloride was prepared in accordance with the method of Grignard.

Isobutenyl chloride was added slowly to the isoamyl magnesium chloride in ethyl ether solution and the reaction mixture treated in the same manner as described in Example I.

The reaction which occurred may be represented by the equation:

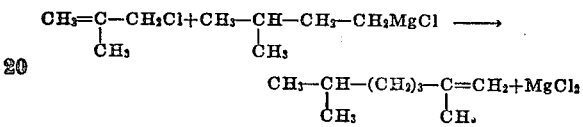

The main reaction product was 2,6-dimethyl heptene-1 which boiled in a temperature range of from 140° C. to 143° C. under atmospheric pressure. The yield obtained was about 80% of the theoretical.

*Example III*

Phenyl magnesium bromide was prepared by reacting phenyl bromide with magnesium turnings in anhydrous ethyl ether.

Isobutenyl was reacted with the phenyl magnesium bromide and the product recovered in accordance with the method described in Example I.

The following reaction was assumed to occur:

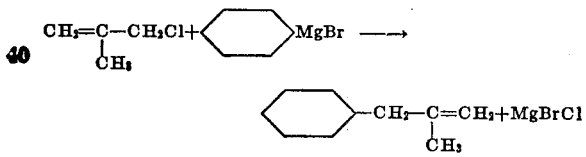

Phenyl isobutenyl (B. R. 175° C. to 176° C.) was obtained in a yield of about 88.5% of the theoretical.

*Example IV*

About 135.75 gm. (1.5 mols) of isobutenyl chloride were charged to a steel autoclave equipped with heating means and means for agitating its contents. About 161.6 gm. (0.5 mol) of tetraethyl lead were added to the contents of the autoclave and the mixture heated at about 125° C. for about 4 hours.

At the end of this time, the reaction mixture was discharged from the autoclave and the solid matter separated therefrom by filtration. The liquid filtrate was fractionated. The main reaction product was isohexylene and polymers thereof. The isohexylene was probably formed in accordance with the reaction:

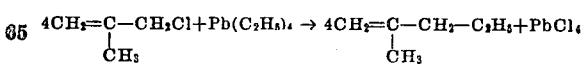

The 2-methyl pentene-1 was obtained in a yield of about 60% of the theoretical.

*Example V*

About 24.32 gm. (1.0 mol) of magnesium turnings were added to about 1 liter of anhydrous ethyl ether contained in a reaction vessel equipped with a reflux condenser and an efficient mechanical stirrer. About 181.0 gm. (2.0 mols) of isobutenyl chloride were added slowly to the stirred mixture while the latter was refluxing at the atmospheric boiling temperature of the ether. The reaction proceeds rapidly, the magnesium being consumed while $MgCl_2$ is precipitated. The exothermic reaction was controlled by cooling the reaction mixture. When substantially all of the magnesium had been reacted, the cooled reaction mixture was treated with about an equivalent volume of a very dilute aqueous HCl solution and the mixture allowed to stratify. The non-aqueous layer was separated, dried and fractionated. After the ether had been removed, about 99 gm. (0.90 mol) of diisobutenyl were distilled at a temperature of about 115° C. under atmospheric pressure.

The diisobutenyl was obtained in a yield of about 90%.

*Example VI*

About 23 gm. (1.0 mol) of sodium were dissolved in about 500 cc. of absolute ethyl alcohol. This solution was stirred and heated gently while about 160 gm. (1.0 mol) of diethyl malonate were added thereto over a period of about 30 minutes. At the end of this time about 90.5 gm. (1.0 mol) of isobutenyl chloride were added to the reaction mixture and the mixture refluxed at a temperature of about 78° C. for about 18 hours to insure complete reaction. It was noted that most of the NaCl formed in the course of the reaction was precipitated during the first hour of refluxing; therefore, it is probable that substantially complete reaction was effected in much less than 18 hours.

The mixture was cooled, sufficient water was added to dissolve the precipitated NaCl, and the solution was extracted with ethyl ether. The ether extractant solution was separated from the water layer, dried and distilled. The alcohol and ether were removed at atmospheric pressure. The residue was fractionated under a subatmospheric pressure. The cut collected in the boiling range of from about 80° C. to about 90° C. at about 1 mm. of Hg was found to be substantially pure mono-isobutenyl diethyl malonate of the formula

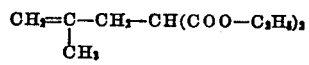

The product was obtained in a yield of about 58% of the theoretical. Mono-isobutenyl diethyl malonate is a new compound. It has a specific gravity (D 20/4) of 1.0010 and a refractive index (N 20/D) of 1.435.

*Example VII*

About 23 gm. (1.0 mol) of sodium were dissolved in about 150 cc. of absolute ethyl alcohol. To this solution were added about 115 gm. of mono-isobutenyl diethyl malonate and then about 136 gm. of isobutenyl chloride were added to the mixture. The mixture was stirred and heated to its boiling temperature for about 3 hours. A small amount of water was added to permit the finely divided NaCl precipitated to form larger crystals. The mixture was then filtered to remove the NaCl. The NaCl was washed with a small amount of ethyl alcohol and the combined filtrate was distilled. The alcohol was distilled from the mixture at atmospheric pressure. The residue was fractionated under a subatmospheric pressure. The cut boiling sharply at about 114° C. under a pressure of about 1 mm.

of Hg was found to be substantially pure diisobutenyl diethyl malonate.

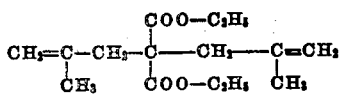

The product was obtained in a yield of about 87%. It is a novel compound having a specific gravity (D 20/4) of 0.999 and a refractive index (N 20/D) of 1.4554.

*Example VIII*

About 209 gm. (2.0 mols) of a mixture of the isopentenyl chlorides

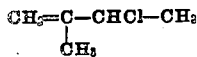

and

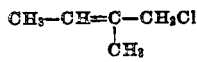

obtained by chlorinating tertiary amylene, were added slowly with continued stirring to a solution containing about 2.0 mols of ethyl magnesium bromide dissolved in about 1200 cc. of anhydrous ethyl ether. After all of the mixture of isopentenyl chlorides had been added, the mixture was refluxed at the boiling temperature of ether for about 1 hour. A voluminous precipitate of magnesium bromide and chloride was formed as the reaction proceeded.

After one hour of refluxing the reaction mixture was poured on ice. The mixture was allowed to stratify and the non-aqueous layer separated, dried and fractionated.

The fractionation yielded about 84 gm. (1.0 mol) of 2,3-dimethyl butene-1 which boiled in a temperature range of from about 57° C. to 59° C. under atmospheric pressure and about 50 gm. (0.6 mol) of 3-methyl pentene-2 which boiled at a temperature of from about 70° C. to 71° C. under atmospheric pressure.

It will be evident to those skilled in the art to which our invention appertains that the same may be executed in a batch, intermittent or continuous manner. In an apparatus for continuous operation, the reaction could be conducted in one stage and the partially or completely reacted mixture rectified in an adjoining stage in which the product could be separated and the unchanged reactants and solvent or suspending medium, if present, conducted to the first or another reaction stage.

The unsaturated malonic acid esters, prepared in accordance with our method by reacting an unsaturated halide possessing an olefinic linkage between two aliphatic carbon atoms at least one of which is tertiary and one of which is linked to a saturated monohalogenated carbon atom with a metallic malonic acid ester which may or may not have an organic radical linked to the carbon atom to which the metal is linked, are novel compounds. These novel compounds may be represented by the formula

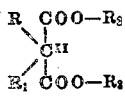

wherein R represents an organic radical containing an olefinic linkage between two aliphatic carbon atoms at least one of which is tertiary and one of which is linked to a saturated carbon atom which in turn is linked to the $C^{II}$ carbon atom and $R_1$ represents hydrogen or an organic radical which may be the same or different than R and which is linked to the $C^{II}$ carbon atom by a carbon atom, $R_2$ and $R_3$ representing organic radicals which may be the same or different and which are linked to the carboxyl groups by carbon atoms. These novel unsaturated malonic acid esters are valuable intermediates in the preparation of the corresponding unsaturated barbituric acids which may be useful as hypnotics and sedatives.

A novel subgroup of useful unsaturated organo magnesium halides which may be prepared in accordance with the process of our invention embraces the organo magnesium halides of the general formula R—Mg—Hal, wherein R represents an organic radical possessing an alkyl chain containing an olefinic linkage between two aliphatic carbon atoms at least one of which is tertiary and linked to a saturated carbon atom which in turn is linked to the magnesium radical, and Hal represents a halogen atom. These novel compounds are useful for a wide variety of purposes. For example, they are useful intermediates in the synthesis of tertiary olefines, unsaturated alcohols, unsaturated ethers, unsaturated ketones, unsaturated acids, etc. A readily available member of the subgroup is isobutenyl magnesium chloride

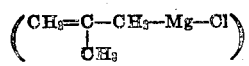

This application is a division of our application, Serial No. 22,170, filed May 18, 1935.

While we have described our invention in a detailed manner and provided specific examples illustrating suitable modes of executing the same, it is to be understood that this mode of presentation was only for the purpose of making the principles of the invention clear and understandable and that modification may be made, since no limitations on the invention other than those imposed by the scope of the appended claims are intended.

We claim as our invention:

1. A process for the production of an unsaturated organic compound which comprises reacting an unsaturated halide possessing an alkyl chain containing an olefinic linkage between two aliphatic carbon atoms at least one of which is tertiary and one of which is linked to a saturated monohalogenated carbon atom with an organo metallic compound wherein the metal radical is directly linked to a carbon atom of the organic radical.

2. A process for the production of an unsaturated organic compound which comprises reacting an unsaturated halide possessing an alkyl chain containing an olefinic linkage between two aliphatic carbon atoms at least one of which is tertiary and one of which is linked to a saturated monohalogenated carbon atom with an organo metallic compound wherein the metal radical is directly linked to a carbon atom of the organic radical, said reaction being effected in the presence of a substantially inert solvent for the unsaturated halide.

3. A process for the production of an unsaturated organic compound which comprises reacting an unsaturated halide possessing an alkyl chain containing an olefinic linkage between two aliphatic carbon atoms at least one of which is tertiary and one of which is linked to a saturated monohalogenated carbon atom with an organo magnesium halide of the general formula R—Mg—Hal, wherein R represents an organic radical linked to the Mg atom by a carbon atom and Hal represents a halogen atom.

4. A process for the production of an unsaturated organic compound which comprises reacting an unsaturated halide possessing an alkyl chain containing an olefinc linkage between two aliphatic carbon atoms at least one of which is tertiary and one of which is linked to a saturated monohalogenated carbon atom with an ethereal solution of an organo magnesium halide of the general formula R—Mg—Hal, wherein R represents a hydrocarbon radical and Hal represents a halogen atom.

5. A process for the production of an unsaturated organic compound which comprises reacting an unsaturated halide possessing an alkyl chain containing an olefinic linkage between two aliphatic carbon atoms at least one of which is tertiary and one of which is linked to a saturated monohalogenated carbon atom with an organo magnesium halide of the general formula R—Mg—Hal, wherein R represents the unsaturated organic radical of the unsaturated halide and Hal represents a halogen atom, the reaction being effected by contacting the unsaturated halide with magnesium, in the presence of an ether, in the ratio of two mols of unsaturated halide to one mol of magnesium.

6. A process for the production of an unsaturated organic compound which comprises reacting isobutenyl chloride with an organo metallo compound wherein the metal radical is directly linked to a carbon atom of the organic radical.

7. A process for the production of an unsaturated organic compound which comprises reacting isobutenyl chloride with an organo metallo compound wherein the metal radical is directly linked to a carbon atom of the organic radical in the presence of a substantially inert solvent for the isobutenyl chloride and the organic reaction product.

8. A process for the production of an unsaturated organic compound which comprises reacting isobutenyl chloride with an ethereal solution of an organo magnesium halide of the general formula R—Mg—Hal, wherein R represents an organic radical linked to the Mg atom by a carbon atom and Hal represents a halogen atom.

9. A process for the production of an isobutenyl malonate which comprises reacting isobutenyl chloride with a metallo malonic acid ester.

10. A process for the production of an isobutenyl diethyl malonate which comprises reacting isobutenyl chloride with sodium diethyl malonate.

11. A process for the production of diisobutenyl which comprises reacting isobutenyl chloride with isobutenyl magnesium chloride, the reaction being effected by contacting the isobutenyl chloride with magnesium, in the presence of an aliphatic ether, in the ratio of two mols of isobutenyl chloride to one mol of magnesium.

12. The unsaturated compound of the general formula

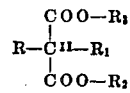

wherein R represents an unsaturated radical possessing an alkyl chain containing an olefinic linkage between two aliphatic carbon atoms at least one of which is tertiary and one of which is linked to a saturated carbon atom which in turn is linked to the $C^{II}$ carbon atom, $R_1$ represents a substituent of the group consisting of hydrogen and organic radicals, and $R_2$ and $R_3$ are alcohols when expressed as $R_2OH$ and $R_3OH$.

13. The unsaturated compound of the general formula

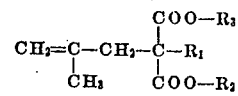

wherein $R_1$ represents a substituent of the group consisting of hydrogen and organic radicals, and $R_2$ and $R_3$ are alcohols when expressed as $R_2OH$ and $R_3OH$.

14. The di-isobutenyl diethyl malonate of the formula:

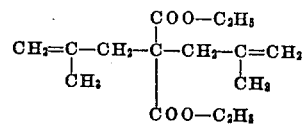

15. The unsaturated organo magnesium halide of the general formula R—Mg—Hal, wherein R represents an organic radical possessing an alkyl chain containing an olefinic linkage between two aliphatic carbon atoms at least one of which is tertiary and linked to a saturated carbon atom which in turn is linked to the magnesium radical, and Hal represents a halogen atom.

16. The isobutenyl magnesium chloride of the formula:

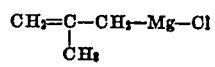

17. An isobutenyl diethyl malonate.
18. An isobutenyl malonate of the formula

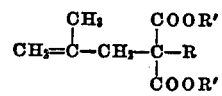

wnere R is a member of the group consisting of hydrogen and a lower alkyl group and R' is a lower alkyl group.

HERBERT P. A. GROLL.
CLARENCE J. OTT.

CERTIFICATE OF CORRECTION.

Patent No. 2,197,362.                                      April 16, 1940.

HERBERT P. A. GROLL, ET AL.

It is hereby certified that error appears in the printed specification of the above numbered patent requiring correction as follows: Page 1, second column, lines 35 and 36, strike out the syllable and words "desig- three other carbon atoms. The $C^{II}$ carbon atom" and insert instead --designated as $C^{III}$ is tertiary, that is, linked to at least--; and that the said Letters Patent should be read with this correction therein that the same may conform to the record of the case in the Patent Office.

Signed and sealed this 30th day of July, A. D. 1940.

Henry Van Arsdale, (Seal)                                                               Acting Commissioner of Patents.